(12) United States Patent
Wang et al.

(10) Patent No.: US 7,142,514 B2
(45) Date of Patent: Nov. 28, 2006

(54) BANDWIDTH SHARING USING EMULATED WEIGHTED FAIR QUEUING

(75) Inventors: Linghsiao Wang, Tustin, CA (US);
Craig Barrack, Irvine, CA (US);
Rong-Feng Chang, Irvine, CA (US)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 899 days.

(21) Appl. No.: 09/808,652

(22) Filed: Mar. 15, 2001

(65) Prior Publication Data

US 2002/0039351 A1     Apr. 4, 2002

Related U.S. Application Data

(60) Provisional application No. 60/236,166, filed on Sep. 29, 2000.

(51) Int. Cl.
*H04L 12/26* (2006.01)

(52) U.S. Cl. .......................... 370/235; 370/412

(58) Field of Classification Search ............... 370/235, 370/412, 413, 417, 418, 468
See application file for complete search history.

(56) References Cited

U.S. PATENT DOCUMENTS

| | | | |
|---|---|---|---|
| 5,231,633 A * | 7/1993 | Hluchyj et al. | 370/429 |
| 5,748,614 A | 5/1998 | Wallmeier | |
| 5,959,993 A | 9/1999 | Varma et al. | |
| 6,052,375 A * | 4/2000 | Bass et al. | 370/412 |
| 6,101,193 A | 8/2000 | Ohba | |
| 6,438,134 B1 * | 8/2002 | Chow et al. | 370/412 |
| 6,570,883 B1 * | 5/2003 | Wong | 370/412 |
| 6,618,354 B1 * | 9/2003 | Sharma | 370/229 |
| 6,683,884 B1 * | 1/2004 | Howard | 370/412 |
| 6,735,174 B1 * | 5/2004 | Hefty et al. | 370/235 |

FOREIGN PATENT DOCUMENTS

| | | |
|---|---|---|
| JP | 08-246291 | 4/1998 |
| JP | 09-227193 | 3/1999 |

OTHER PUBLICATIONS

Srinivasan Keshav, "An Engineering Approach to Computer Networking: ATM Networks, the Internet, and the Telephone Network", pp. 209-263, 1997, Addison Wesley, Reading, MA.

S. Keshav, "An Engineering Approach to Computer Networking: ATM Networks, the Internet, and the Telephone Network", pp. 223-255, 1997, Addison-Wesley, Reading, MA.

* cited by examiner

*Primary Examiner*—Ricky Q. Ngo
*Assistant Examiner*—Richard Chang
(74) *Attorney, Agent, or Firm*—Lawrence E. Laubscher, Jr.

(57) ABSTRACT

A method of scheduling queue servicing in a data packet switching environment is provided. The method includes a sequence of cyclical steps. The output queues are scheduled for servicing on a least credit value basis. An output queue is selected from a group of output queues associated with a communications port. The selected output port has at least one Payload Data Unit (PDU) pending transmission and a lowest credit value associated therewith. At least one PDU having a length is transmitted from the selected output queue and the credit value is incremented taking the length of the transmitted PDU into consideration. The transmission of PDUs is divided into transmission periods. Once per transmission period credit values associated with output queues holding PDUs pending transmission are decremented in accordance with transmission apportionments assigned for each output queue. The method emulates weighted fair queue servicing with minimal computation enabling hardware implementation thereof.

9 Claims, 4 Drawing Sheets

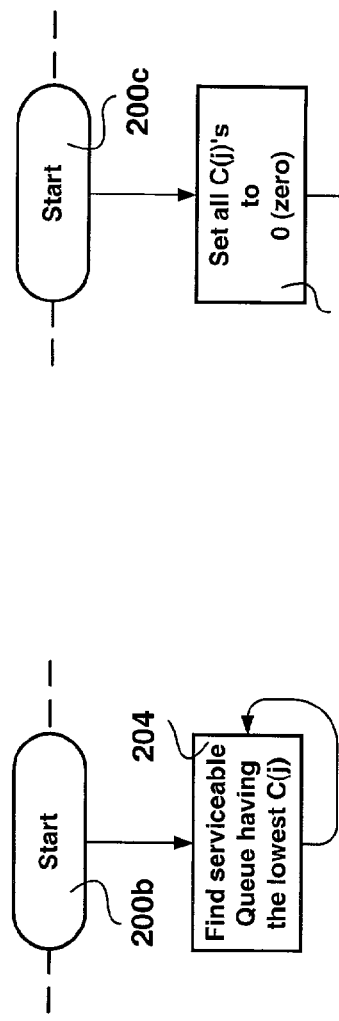
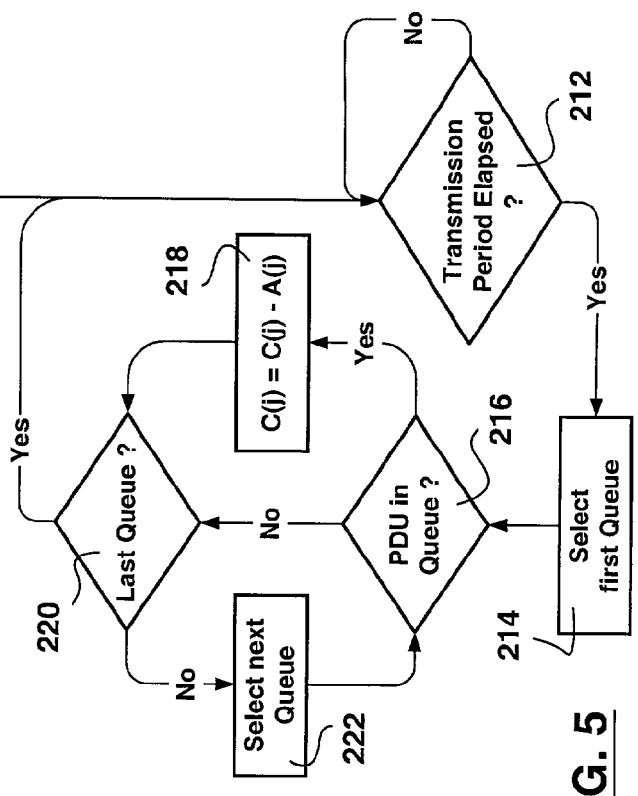
FIG. 5
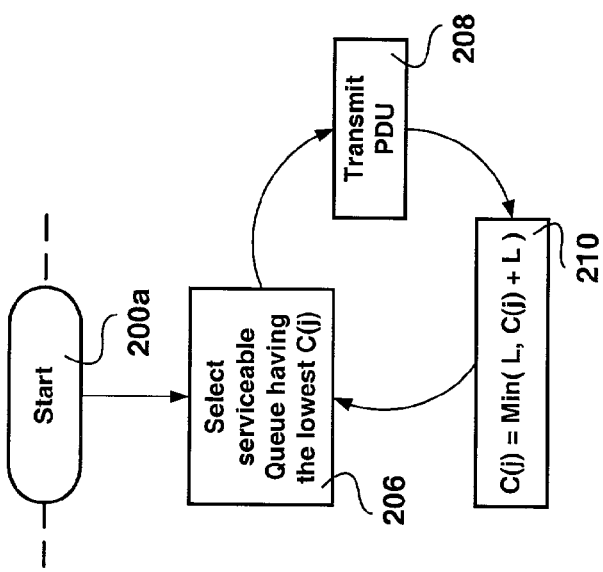
FIG. 4
FIG. 3
--- Parallel Processes ---

BANDWIDTH SHARING USING EMULATED WEIGHTED FAIR QUEUING

This application claims the benefit of U.S. provisional application No. 60/236,166 filed Sep. 29, 2000.

FIELD OF THE INVENTION

The invention relates to the field of electronic data transport, and in particular it relates to methods and apparatus for partitioning egress bandwidth between data traffic flows at a switching point in a data transport network.

BACKGROUND OF THE INVENTION

In the field of PDU switching, a switching device 10 (see FIG. 1) of a data switching node 12 transfers Payload Data Units (PDU) from input ports 20 carrying data traffic flows 22, generally referred to as the input, to the output which has associated therewith a plurality of output ports 30 carrying data traffic flows 32. Examples of PDUs include: packets, cells, frames but not limited thereto.

In order to provide Quality-of-Service (QoS) guarantees, a Class-of-Service (CoS) is associated to each PDU and data traffic flow 32. PDUs having the same CoS and destined for a particular output port 30, are aggregated into a single data flow 32. PDUs 106 associated with a single data flow 32 are queued in a corresponding output queue Q(j) for transmission over a physical medium 102 of the output port 30. Each one of m output queues Q(j) associated with the output port 30 may be implemented in hardware or software and is ascribed at least a transmission bandwidth and priority in relation to other data traffic flows 32 destined for the output port 30. As such, a high priority PDU associated with a voice connection may await in an output queue Q(m−1) having a high service priority associated therewith while a low priority PDU associated with an electronic mail transfers session may await in an output queue Q(0) having a low service priority associated therewith.

The selection of PDUs 106 for transmission over the physical medium is made by a scheduler 40. In providing QoS guarantees it is generally required that high priority PDUs receive a guaranteed fraction of the transmission bandwidth. Therefore high priority PDUs benefit from preferential processing thereof.

Due to a varying length 110 of the PDUs conveyed, all data traffic flows 32 become subject to transmission delay and transmission jitter. It is considered desirable for low transmission priority output queues to receive some guaranteed fraction of bandwidth so as not to completely be blacked out during periods of data traffic bursts of high priority PDUs. To implement CoS and to achieve low transmission delays and jitter, an enforcer 50 is used in queuing PDUs in the output queues Q(j) ensuring that not too many high priority PDUs 106 are queued for transmission during an interval of time.

Several theoretical models have been developed to partition the transport bandwidth of the output physical medium 102 among the output queues Q(j) implementing Weighted Fair Queuing (WFQ) techniques. One such technique is described by Srinivasan Keshav in "An Engineering Approach to Computer Networking: ATM Networks, the Internet, and the Telephone Network" published by Addison Wesley, 1997, Reading Mass., pp 209–263.

WFQ techniques provide a solution to the problem of bandwidth partitioning while being considered impractical to implement in hardware. Theoretical queue servicing models typically assume that the computational time spent implementing WFQ is infinitesimal and therefore ignored. In practice the computational time can not be ignored. WFQ techniques use iterative calculations in sequencing output queue servicing. Iterative calculations are time intensive. WFQ sequencing calculations also require division operations which represent sources of great implementation complexity in hardware.

There therefore is a need to develop methods to sequence output queue servicing in a manner that emulates weighted fair queuing techniques while overcoming the above presented shortcomings.

SUMMARY OF THE INVENTION

In accordance with a preferred embodiment of the invention methods of output queue service scheduling in a data switching environment include a sequence of cyclical steps. Output queues are scheduled for servicing on a least credit value basis. An output queue is selected from a plurality of output queues associated with a communications port. The selected output port has at least one Payload Data Unit (PDU) pending transmission and a lowest credit value associated therewith. At least one PDU having a length is transmitted from the selected output queue and the credit value is incremented taking the length of the transmitted PDU into consideration. The transmission of PDUs is divided into transmission periods. Once per transmission period, credit values associated with output queues holding PDUs pending transmission are decremented in accordance with transmission apportionments assigned for each output queue.

The methods presented herein emulate weighted fair queue servicing techniques with minimal computation enabling hardware implementation thereof.

BRIEF DESCRIPTION OF THE DRAWINGS

The invention will be better understood by way of the following detailed description of a preferred embodiment of the invention with reference to the appended drawings in which:

FIG. 3 is a flow diagram depicting a process of transmitting a PDU from an output queue having a lowest credit value in accordance with an embodiment of the invention;

FIG. 4 is a flow diagram depicting a general process finding a serviceable output queue based on credit values held in credit counters associated with output queues in accordance with an embodiment of the invention;

FIG. 5 is a flow diagram depicting a process of updating credit counters in accordance with an embodiment of the invention;

It will be noted that like features have similar labels.

DETAILED DESCRIPTION OF THE PREFERRED EMBODIMENT

Figure 1:
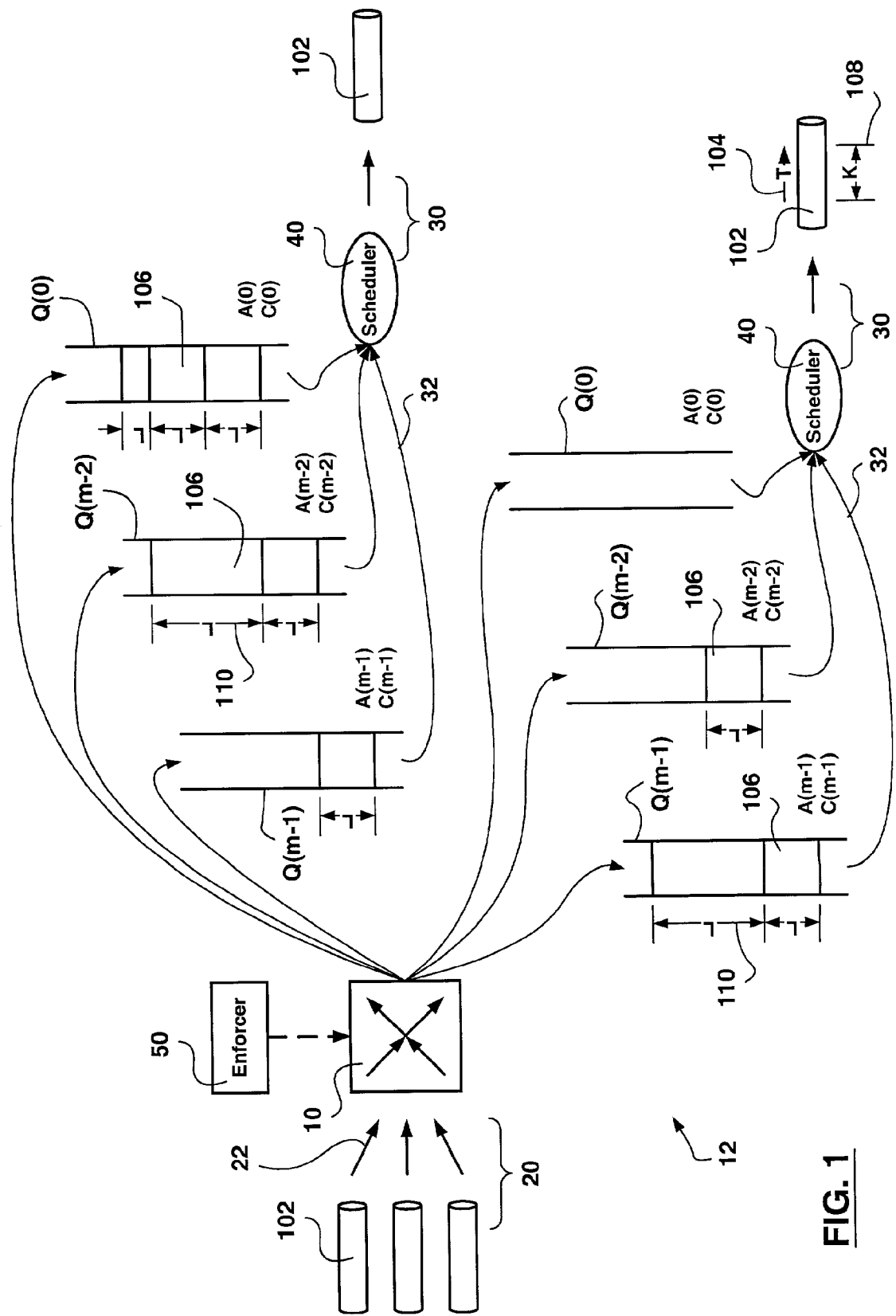
FIG. 1 is a schematic diagram showing an exemplary flow of PDUs through a switching device.

FIG. 1 is a schematic diagram showing an exemplary flow of PDUs through a switching device.

Each PDU irrespective of CoS association is conveyed over the physical transmission medium 102 at a transmission rate T schematically shown at 104 of the physical medium 102 as each PDU 106 is considered indivisible for purposes of transmission.

The transmission of data over the output physical medium 102 is divided in sequential transmission periods, each transmission period having an integer duration K schematically shown at 108.

In accordance with the invention, each output queue Q(j) is ascribed a desired transmission bandwidth apportionment A(j). The ascribed value A(j) to each output queue 112 is an integer corresponding to a fraction of the transmission period K, such that the processing time required to serve all transmission bandwidth apportionments add up to the transmission period K. The choice of performing integer calculations ensures fast real-time processing.

Although the A(j)'s implicitly represent fractional portions of the time period K, it may be computationally more efficient to specify A(j) values in terms of bits, bytes, octets, cells, frames, etc. Persons of ordinary skill in the art would appreciate that the units used cancel out regardless of the design choice implemented. To facilitate understanding of the concepts presented herein, the values held by A(j)'s, C(j)'s, and L will be understood to be expressed in bytes heretofore.

A second parameter used in sequencing queue servicing is the length L of each PDU 106. While each A(j) represents a portion, measured in bytes as indicated hereinabove, of the transmission period K to be devoted to transmission of PDUs associated with output queue Q(j), each PDU length L represents the amount of data actually transmitted in servicing a particular output queue as each PDU is transmitted therefrom. The PDU length L includes the actual PDU payload length and may additionally account for: transmission guard gaps, padding, existing headers, headers added by lower transmission protocol layers, etc.

In accordance with a preferred embodiment of the invention, a credit counter C(j) is associated with each output queue Q(j) and each output queue Q(j) is serviced if and only if there is at least one PDU awaiting transmission in an ordered fashion biased towards servicing the output queue Q(j) having the lowest credit counter C(j), first.

Initially the credit counters C(j) are set to 0 (zero).

Each credit counter C(j) is changed upon servicing the corresponding output queue Q(j) and the transmission of a PDU 106 of length L from that output queue Q(j) over the physical transmission medium 102.

If the credit counter C(j) is greater or equal to zero, the credit counter C(j) is assigned the value of length L of the PDU 106 just transmitted. If the credit counter C(j) is less than zero, then the credit counter C(j) is assigned the value C(j)+L. Therefore as each PDU 106 is transmitted, the simple process described herein assigns the lesser of L and C(j)+L to the corresponding credit counter C(j) with minimal computation.

Once per transmission period K, the output queues Q(j) are examined for PDUs 106 pending transmission. If a particular output queue Q(j) contains at least one PDU 106 pending transmission, then the corresponding credit counter C(j) is assigned the value C(j)−A(j). If a particular output queue Q(j) is found empty, the corresponding credit counter C(j) is left unchanged.

During the output queue service sequencing process the credit counters C(j) may contain negative values. C(j)'s having negative values represent output queues Q(j) which have been shortchanged with respect to the transmission of PDUs 106.

Figure 2:
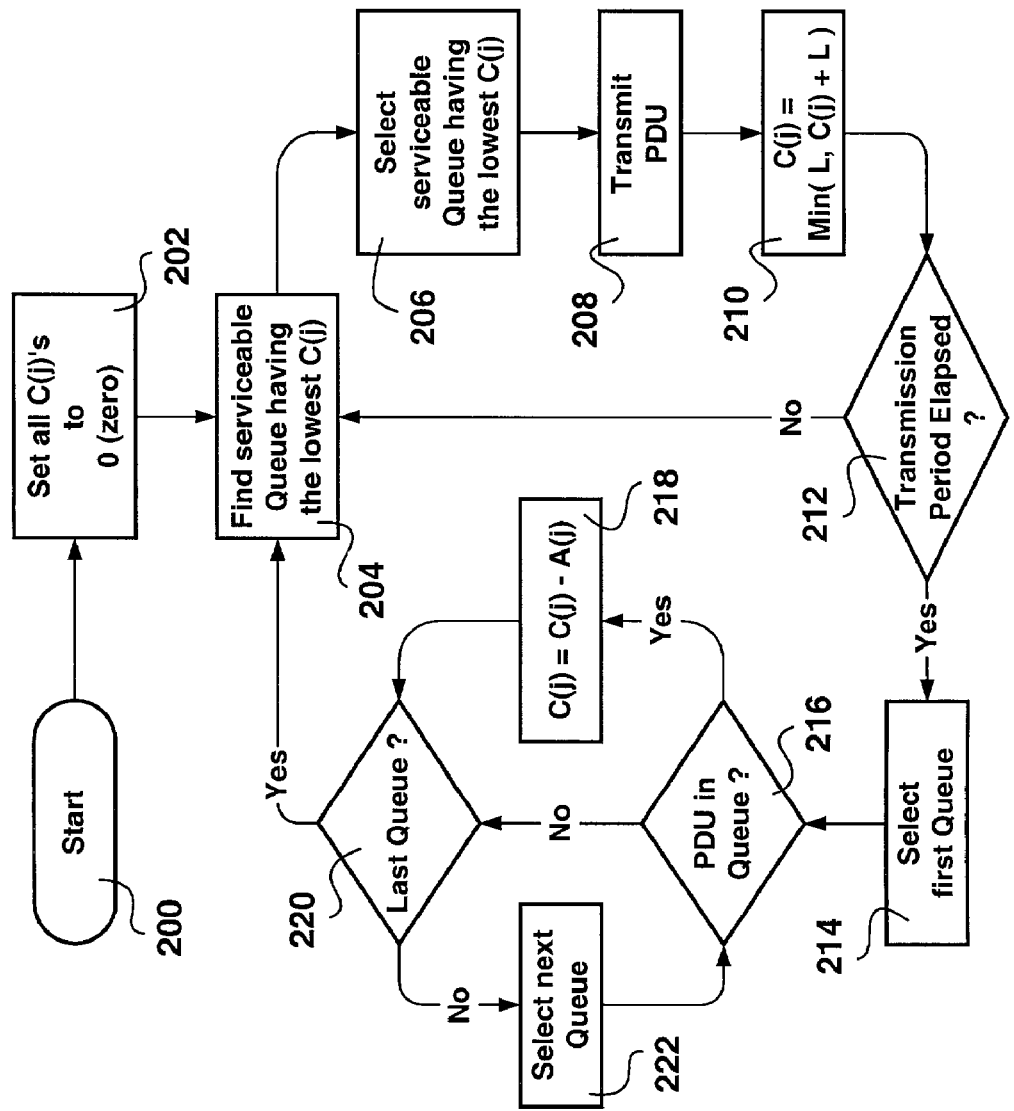
FIG. 2 is a flow diagram depicting a process of sequencing queue servicing using emulated weighted fair queuing techniques in accordance with an embodiment of the invention.

FIG. 2 is a flow diagram depicting a process of sequencing output queue servicing in accordance with an embodiment of the invention. This output queue service sequencing process is a serial one, the invention is not limited to serial implementations of emulated weighted fair queuing techniques. An exemplary parallel implementation of the output queue service sequencing process is described below with reference to FIG. 3, FIG. 4 and FIG. 5.

The output queue service sequencing process is started in step 200. Prior to the start of a first transmission period K, all credit counters C(j) are loaded with 0 (zero) values in step 202.

A serviceable output queue Q(j) having the lowest credit value C(j) is found in step 204. Exemplary processes of finding a serviceable output queue having the lowest credit value are presented below with reference to FIG. 6 and FIG. 7.

The serviceable output queue having the lowest credit value is selected in step 206 and serviced by transmitting at least one PDU over the transmission medium 102 in step 208. The credit counter C(j) corresponding to the serviced output queue Q(j) is set to the minimum between the length L of the at least one transmitted PDU and C(j)+L in step 210.

The process resumes from step 204 if a transmission period K has not elapsed, fact ascertained in step 212.

If the transmission period K has elapsed in step 212, the process selects in step 214 a first output queue Q(j) and if it is found, in step 216, to contain at least one PDU pending transmission, the associated credit counter C(j) is set to C(j)−A(j) in step 218.

If the selected output queue does not contain at least one pending PDU in step 216 or subsequent to the assignment in step 218, the process identifies in step 220 whether the selected output queue Q(j) is the last output queue to be processed.

If the selected output queue Q(j) is not the last output queue to be processed, then the process selects, in step 222, a next output queue and resumes from step 216.

Subsequent to identifying the last output queue to be processed in step 220, the process proceeds with finding a serviceable output queue having a lowest credit value, in step 204.

The process depicted in FIG. 2 is a sequential queue service sequencing process. A person of ordinary skill in the art would understand that equivalent queue service sequencing processes can be implemented such as but not limited to the parallel process depicted in FIG. 3, FIG. 4, and FIG. 5.

In particular, the preferred parallel implementation depicted in FIG. 3, FIG. 4 and FIG. 5 benefits from a continuous transmission of PDU's 106 by the queue servicing subprocess of FIG. 3 not interrupted by the execution of subprocesses of FIG. 4 and FIG. 5.

Ideally all credit counters C(j) would have a zero value after each transmission period K elapses. That would mean that, for every transmission period K, the amount of data transmitted with respect to each output queue Q(j) would exactly correspond to the allocated bandwidth for each particular output queue Q(j). In practice, the PDUs 106 have variable lengths, the PDUs are indivisible, and the data traffic may be bursty. The residual values of each credit counter C(j) after one transmission period K represent temporary imbalances in data transmission.

In accordance with the preferred embodiment of the invention, by always selecting for servicing the output queue Q(j) having the lowest associated credit counter value C(j) the induced temporary imbalances are restored over the long term.

Figure 6:
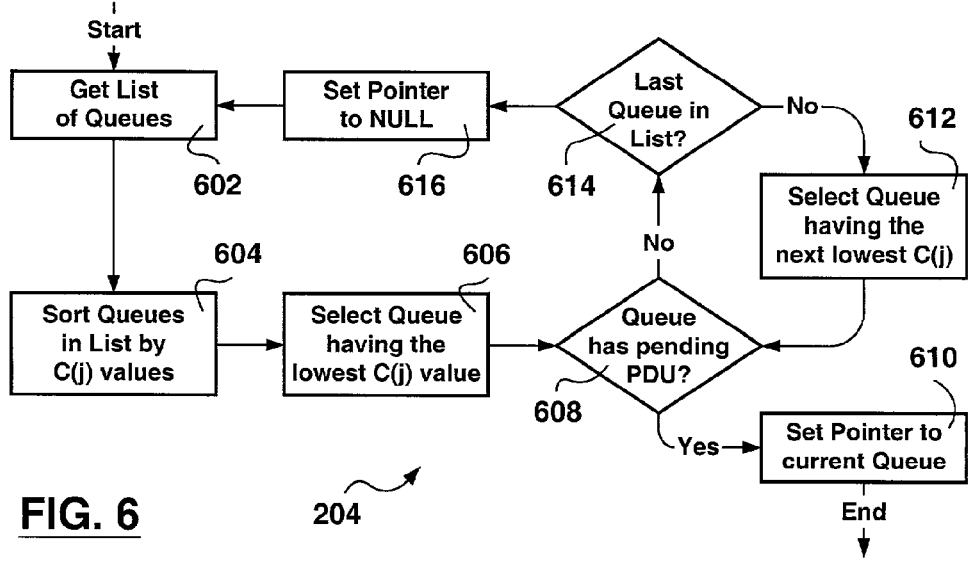
FIG. 6 is a flow diagram depicting an exemplary process of finding a serviceable output queue having a lowest credit value in accordance with an exemplary implementation of the invention.

FIG. 6 is a flow diagram depicting an exemplary process of finding a serviceable output queue having a lowest credit value in accordance with an exemplary implementation of the invention.

A list of output queues associated with an output port is obtained in step 602 and sorted in step 604 according to the credit values held in the corresponding credit counters C(j). The output queue having the lowest credit value is selected in step 606 and is inspected for pending PDUs 106 pending transmission in step 608.

If the selected output queue has at least one PDU pending transmission, a pointer is set, in step 610, to point to the current output queue Q(j) having found a serviceable output queue having a lowest credit value. The pointer is inspected in step 206 in selecting the serviceable queue having the lowest credit value. Other methods known in the art include, but are not limited to, loading a register with the current output queue designation Q(j).

If the selected output queue does not have at least one PDU pending transmission in step 608, a next output queue having a next lowest credit value is selected in step 612 and the process resumes from step 608.

If the last output queue in the list was inspected, fact ascertained in step 614, the sets the pointer to NULL in step 616 and resumes from step 602.

Figure 7:
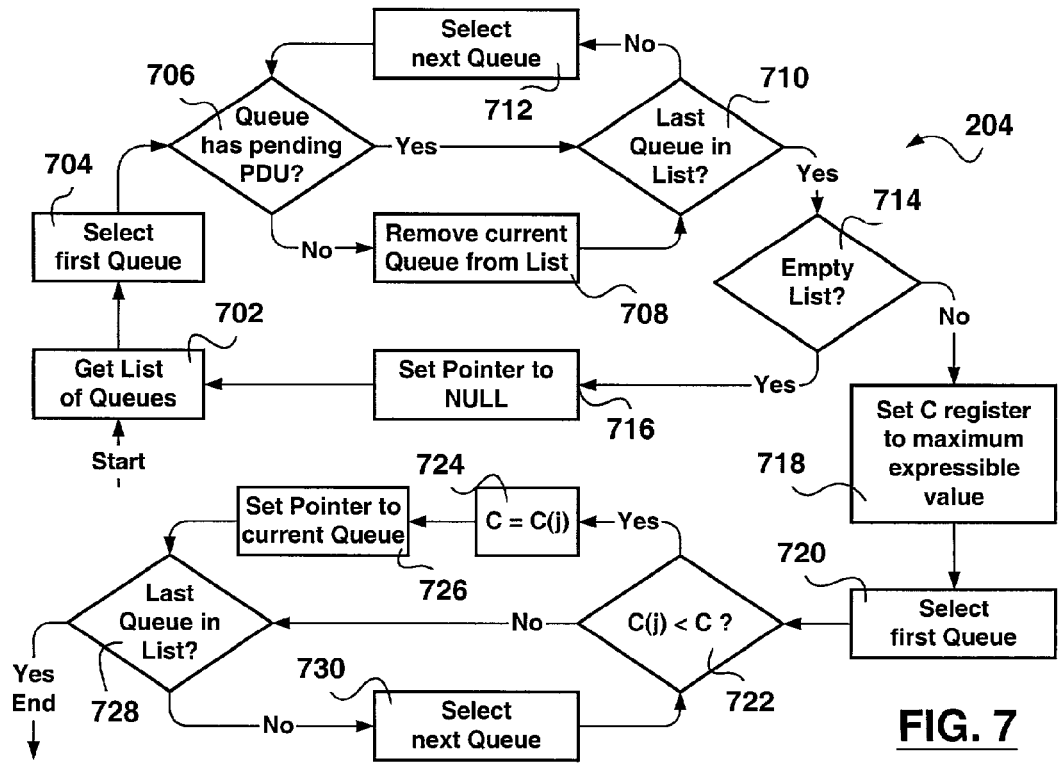
FIG. 7 is a flow diagram depicting another exemplary process of finding a serviceable output queue having a lowest credit value in accordance with another exemplary implementation of the invention.

FIG. 7 is a flow diagram depicting another exemplary process of finding a serviceable output queue having a lowest credit value in accordance with another exemplary implementation of the invention.

A list of output queues associated with an output port is obtained in step 702.

Initially output queues not having pending PDUs are discarded from the list by scanning through the list. A first output queue is selected in step 704 and inspected in step 706 to determine whether the selected output queue contains at least one PDU pending transmission.

If the currently selected output queue does not contain at least one PDU pending transmission in step 706, the currently selected output queue is removed from the list in step 708. A next output queue is selected in step 712 if the end of the list has not been reached, fact ascertained in step 710 and the process then resumes from step 706.

If the currently selected output queue is found to contain at least one PDU pending transmission in step 706, the process continues by selecting a next output queue in step 712 if the end of the list has not been reached.

If the end of the list is reached in step 710, the list is inspected in step 714.

If in inspecting the list in step 714 it is found that the list does not contain any output queues, the process sets the pointer to NULL in step 716 and resumes execution from step 702.

If in inspecting the list in step 714 it is found that the list contains at least one output queue the process continues by scanning through the remaining list for an output queue having a lowest associated credit value.

A register C holding the lowest credit value found so far is set to a maximum machine expressible value in step 718. A first output queue is selected from the remaining list in step 720 and its associated credit value is compared against the value held in register C in step 722.

If the credit value associated with the currently selected output queue is lower than the value held in the register C, the register C is assigned the credit value in step 724 and the pointer is set to point to the current output queue in step 726. The process continues to scan the reminder of the list by selecting a next output queue in step 730 until the end of the list is reached in step 728.

The methods presented herein emulate weighted fair queue servicing techniques with minimal computation enabling hardware implementation thereof.

It is understood that the above described embodiments are exemplary only and that modifications are possible without departing from the spirit of the invention, the scope of the invention being defined solely by the appended claims.

We claim:

1. A method of scheduling for servicing a plurality of output queues associated with a communications port, the method comprising cyclical steps of:

selecting for servicing an output queue holding at least one Payload Data Unit (PDU) from the plurality of output queues, the selected output queue having an associated credit counter holding a lowest credit value;

selectively incrementing the credit value held in the credit counter to account for the transmission of the at least one PDU having a length from the selected output queue; and periodically decrementing the credit values of a subgroup of the corresponding plurality of credit counters associated with output queues holding at least one PDU pending transmission in accordance with transmission bandwidth apportionments assigned to each output queue;

wherein selectively incrementing the credit value held in the credit counter associated with the selected output queue comprises setting the credit value of the credit counter to the length of the packet if the credit value of the credit counter has a positive value, whereby selecting for servicing the output queue having the lowest credit value emulated weighted fair queuing is achieved in the long run with minimal computation.

2. A method as claimed in claim 1, wherein selectively incrementing the credit value of the credit counter associated with the selected output queue comprises setting the credit value of the credit counter to a sum between the current credit value of the credit counter and the length of the packet if the credit value of the credit counter has a negative value.

3. A method as claimed in claim 2, wherein the transmission of PDUs is divided into transmission periods and periodically decrementing the credit values of the subgroup of the plurality of credit counters is performed once during each transmission period.

4. A method as claimed in claim 3, wherein decrementing the credit values of the subgroup of the plurality of credit counters is performed at the end of each transmission period.

5. A method as claimed in claim 4, wherein decrementing the credit values of the subgroup of credit counters comprises setting the value of each such credit counter to the current credit counter value minus the value of the corresponding apportionment.

6. A method as claimed in claim 2 further comprising sorting the output queues holding at least one PDU pending transmission according to the credit values held in the corresponding credit counters.

7. A method as claimed in claim 2 further comprising scanning through the credit counters of the plurality of output queues having at least one PDU pending transmission for the lowest credit value held in the corresponding credit counters.

8. A scheduler implementing the method of queue service scheduling claimed in claim 2.

9. A data switching node implementing the method of queue service scheduling as claimed in claim 2.

* * * * *